Aug. 27, 1935.  C. DE SAINT-MARTIN  2,012,260
RAIL VEHICLE
Filed June 13, 1932
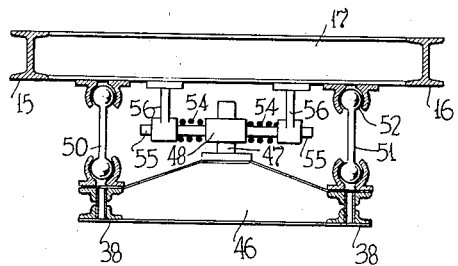
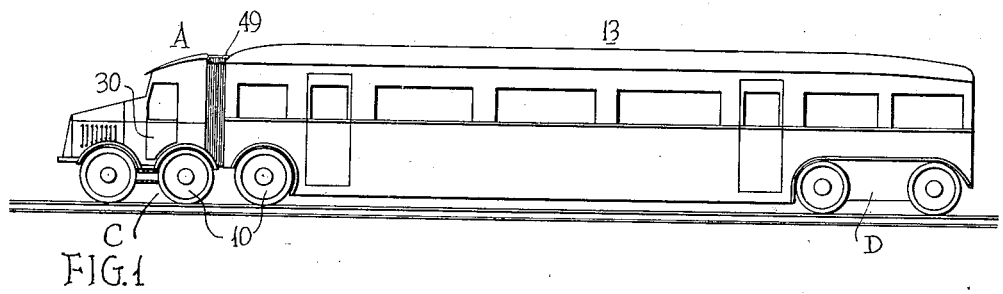
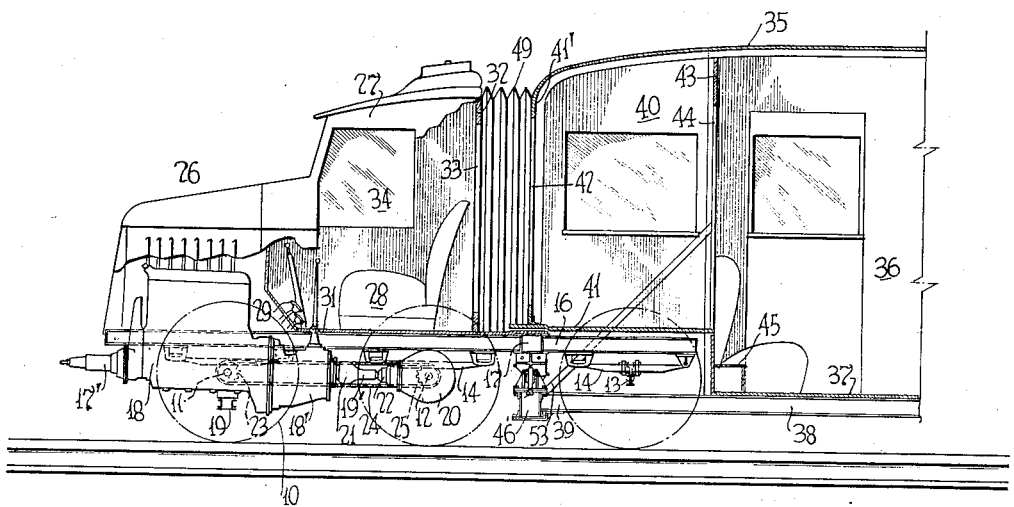
INVENTOR
CHARLES DE SAINT-MARTIN
BY
ATTORNEYS Patented Aug. 27, 1935

2,012,260

UNITED STATES PATENT OFFICE 2,012,260

RAIL VEHICLE

Charles de Saint-Martin, Paris, France, assignor to Michelin Et Cie, Clermont-Ferrand, France, a corporation of France Application June 13, 1932, Serial No. 616,994 In France June 13, 1931

5 Claims. (Cl. 105—3)

The invention relates to a rail car, and particularly to a self-propelled car.

It is an object of the invention to effect a greater flexibility of such a car by dividing the power unit from the useful load carrying unit, and at the same time using common means for supporting the adjacent ends of the power and load carrying units.

This object is attained in large measure by making the power unit a multi-wheeled truck carrying a motor and an operator's cab, and having means thereon for pivotally supporting the adjacent end of a trailer unit to allow the vehicle to proceed around curved tracks.

Another object of the invention is the improvement of the suspension of the trailer unit from the power unit.

By dividing the car into power and trailer units, it will be obvious that the entire car will not be incapacitated for service for any long period of time, for if either of the units is laid up for repairs for any reason, it can readily be brought into operative association with another unit, of which a supply will always be in reserve and the car keep continuously in service. The invention is also characterized by the compact arrangement of the drive and the arrangement of drive at the front of the car thereby propelling it with greater tractive effort, the tractive wheels being under the greater load under all conditions of service, since they carry the motor and other dead loadings.

The suspension is an underslung suspension tending toward greater stability and also tending to bring the truck carrying the power unit and the end of the trailer adjacent thereto in centered relation to the track, thereby limiting the flange rub on the side of the rails. According to this feature of the invention, the body of the trailer unit is suspended from the truck of the power unit and from a truck at the end remote from the power unit by two connecting links articulated, for example, by a universal joint, such as a ball and socket joint, on the one hand to the body under frame and on the other hand to the truck frame, for example, to a cross member connecting the truck side rails. A means is provided for pivotally connecting the truck and body to permit the easy operation around curves and for taking the traction and braking forces.

Other and further objects and advantages and the manner in which they are attained will become apparent from the drawing forming a part hereof and the detailed description following:

In the drawing:

Fig. 1 is a view in side elevation of a rail vehicle according to the invention.

Fig. 2 is a more or less diagrammatic view showing the forward part of the vehicle in partial central longitudinal section.

Fig. 3 is a diagrammatic transverse sectional view showing the suspension and guiding connection between truck and body unit.

As shown in the drawing, the rail vehicle of my invention comprises the power and driving unit A and the trailer unit B supported on front and rear swivelled trucks C and D.

The power unit is a self-contained unit comprising a six wheel truck, the wheels being designated at 10. These wheels are arranged on three pairs of stub axles spaced longitudinally from one another and extending transversely of the frame. The front set of stub axles is indicated at 11, the second set at 12 and the rear set at 13. These axles are suitably sprung from the truck frame by the cantilever springs 14. The rear stub axles are fixed non-driving axles, while the front and intermediate sets of stub axles 11 and 12 are drive axles connected to drive the four wheels connected therewith.

The truck frame comprises side beams 15 and 16, and any suitable number of transverse and diagonal interbracing members, one of which comprises a transverse beam 17 between the two rear axles. The front driven axles are preferably short-stub axles terminating short of the central portion of the truck, thereby leaving a space for the location of the motor 18 at the front of the truck in a low swung relation between the short stub axles over a fixed cross member 19 offset downwardly at the center and secured to the side beams of the truck.

The drive from the motor 18, which is shown to be a usual type of internal combustion motor having its crank shaft 17' substantially in line with the axles 11 and 12, is rearwardly through a usual form of transmission 18', through propeller shaft 19', to a differential 20 driving the wheels on the driven axle 12. The propeller shaft is provided with the usual universal joints 21 and 22.

The forward wheels are driven from the short stub axles 11 connected thereto by a driving connection from the rear driven axle, the lateral portions of this axle being provided for this purpose with sprocket wheels as 25 connected by a chain, as 24, to similar sprocket wheels, as 23, on the front wheel axles. It will thus be seen that a very compact arrangement of motor and driving mechanism is provided for driving the four front wheels of the power unit.

The power unit carries in addition to the motor and driving connections to its wheels, the usual hood 26 enclosing the motor and in rear thereof the closed cab 27 carrying the operators seat 28 into which the various controls, as 29, extend in convenient relation to the operator's seat. A door 30 is provided at the side of the operator's cab; the floor 31 of the cab is located at a level just above the frame of the truck upon which the entire cab structure is suitably secured. The transverse rear wall 32 of the cab terminates slightly in rear of the axle 12 and is provided with a door way opening, as 33, affording a communicating passage with the trailer unit B to be described. At front and sides the cab is provided with windows as 34 affording clear view ahead and to the side.

The lines of the side, top and bottom walls of the cab merge, to produce a stream line effect, into the lines of the forward portion of the body 35 of the trailer unit.

The trailer unit comprises the body 35 having doors and window openings and having a main compartment 36 between the trucks from which it is suspended to receive the passengers. The floor 37 of this compartment is dropped down low to provide a low center of gravity and the easy riding qualities that go with it, and the entire body superstructure rests upon two main longitudinal beams 38 extending below the floor line and extended at each end as at 39 under the truck frames. It is from the ends of these beams that the body is suspended from the trucks in a manner to be described.

The end of the body adjacent the power truck has a forward extension over the truck frame and forms a baggage compartment 40 having its floor 41 substantially on a level with the floor of the cab. Its front transverse wall 41' is closely adjacent the rear transverse wall 32 of the cab and is provided with a door way opening 42 communicating with the door way opening of the cab. The rear wall 43 of this compartment 40 is likewise provided with a door way opening 44 to afford passageway between it and the passenger compartment 36. Steps 45 may be provided between the two floor levels.

The front beam extensions 39 are connected by a cross member 46 carrying a king pin 47 having a pivotal connection with the bearing block 48 carried by the transverse member 17 of the truck frame. This pin and bearing allow the truck and trailer to pivot relative to each other when going around curves, and take the traction and braking forces between the two units.

The pivotal connection 47, 48 is substantially in the vertical plane of the forward wall 41' of the trailer body superstructure, and the cab and trailer flooring has a free overlapping relation in substantially this plane, which permits this pivotal movement without interrupting the continuous floor surface. Such constructions are well known in the railway art and need not be further detailed herein.

The weight of the body is borne from the trucks by the articulated links 50 and 51 connected on the one hand to the transverse member 17 of the truck and on the other hand to the front end of the body under frame. The articulated connection may be in the form of ball and socket joints 52; permitting a limited universal movement, when turning a curve. By this construction, it will be seen that relative turning movement between truck unit and trailer body tends to cause a slight raising of the body, so that the weight of the body, in straight-away running, always tends to keep the truck centered on the track.

To prevent undue deflection of the projecting ends of the beams, diagonal braces indicated at 53 may extend up into the body framing, not shown.

The rear portion of the trailer body may be supported from the rear truck D in a manner entirely similar to the support of the front end from the power unit truck C.

To permit slight lateral movement between the truck and trailer in rounding a curve the bearing 48 may be allowed a limited transverse movement cushioned as by springs 54. To this end the bearing may be mounted through bars 55 on opposite sides thereof in bearing brackets 56 projecting downwardly from the truck frame. The springs 54 encircle the bars and are arranged between the bearing block and the bearing brackets and serve to cushion the shock of a sudden sharp turn, and return the body to a centered relation after turning a curve. Transverse shocks to the trucks due to track irregularities are also absorbed in this way and not transmitted to the body of the trailer unit.

To enclose the space between the rear wall of the cab and the front wall of the trailer body superstructure, against the entrance of dirt and weather and to avoid an unsightly gap, yet permit the pivotal movement between these parts, a flexible diaphragm 49 of the bellows type may interconnect the margins of the units and bridge the gap between them.

While the invention has herein been described in accordance with a specific embodiment, it will be understood that, it is capable of being embodied in numerous modified forms, all of which will be readily apparent to one skilled in the art, and all such changes and modifications are intended to be included within the spirit and scope of the appended claims.

What I claim is:—

1. In a rail vehicle, a wheeled truck having a frame, a body having an underframe extended under the truck frame and pivotally suspended therefrom, said body extended over the truck frame but free to move relatively thereto, said body supported by the underframe.

2. In a rail vehicle, the combination of a truck frame, a body having an underframe extending under the truck frame and having an articulated connection therewith, said connection comprising a central swivelled connection, and laterally spaced suspension links interconnecting the body underframe and truck frame.

3. In a rail vehicle, the combination of a truck frame, a body having an underframe extending under the truck frame and having an articulated connection therewith, including laterally spaced universally movable suspension links and a central swivelled connection permitting limited relative lateral movement between the truck frame and the body underframe.

4. In a rail vehicle the combination of a truck frame, a body having an underframe extending under the truck frame and having an articulated connection therewith, said connection comprising a central swivelled connection, having limited lateral movement and means for cushioning such movement, and laterally spaced suspension links interconnecting the body underframe and truck frames.

5. In a rail vehicle, a truck, three pairs of stub axles on said truck, one adjacent each end of said truck and the third disposed intermediate the ends thereof, wheels on said axles, a power plant carried by said truck between the forward pair of axles and extending forwardly thereof, a cab on said truck, and disposed above the intermediate pair of stub axles, and a trailer unit pivotally supported by said truck at a point adjacent the rear end thereof and between the intermediate and rear pairs of axles.

CHARLES DE SAINT-MARTIN.